United States Patent
Nishihara et al.

(10) Patent No.: US 8,351,230 B2
(45) Date of Patent: Jan. 8, 2013

(54) SWITCHING POWER SUPPLY WITH PLURAL RESONANT CONVERTERS AND VARIABLE FREQUENCY

(75) Inventors: Hideki Nishihara, Ehime (JP); Akeyuki Komatsu, Ehime (JP)

(73) Assignee: Panasonic Corporation, Osaka (JP)

( * ) Notice: Subject to any disclaimer, the term of this patent is extended or adjusted under 35 U.S.C. 154(b) by 599 days.

(21) Appl. No.: 12/667,918

(22) PCT Filed: Jun. 25, 2008

(86) PCT No.: PCT/JP2008/001647
§ 371 (c)(1),
(2), (4) Date: Jan. 6, 2010

(87) PCT Pub. No.: WO2009/011091
PCT Pub. Date: Jan. 22, 2009

(65) Prior Publication Data
US 2010/0182805 A1    Jul. 22, 2010

(30) Foreign Application Priority Data
Jul. 18, 2007    (JP) .................................. 2007-186385

(51) Int. Cl.
*H02M 3/335*    (2006.01)
(52) U.S. Cl. ........................... 363/71; 363/21.02; 363/97
(58) Field of Classification Search ............... 363/21.01, 363/21.02, 21.04, 71, 97
See application file for complete search history.

(56) References Cited

U.S. PATENT DOCUMENTS

| | | | | |
|---|---|---|---|---|
| 5,105,351 A | * | 4/1992 | Harada et al. ................... | 363/65 |
| 5,311,419 A | * | 5/1994 | Shires ............................. | 363/65 |
| 5,616,968 A | | 4/1997 | Fujii et al. | |
| 2002/0175719 A1 | | 11/2002 | Cohen | |
| 2008/0024094 A1 | | 1/2008 | Nishihara et al. | |
| 2008/0190906 A1 | | 8/2008 | Aigner | |
| 2010/0182805 A1 | * | 7/2010 | Nishihara et al. .......... | 363/21.02 |

FOREIGN PATENT DOCUMENTS

| | | |
|---|---|---|
| DE | 10 2005 036 806 | 2/2007 |
| JP | 54-071360 | 6/1979 |
| JP | 63-250213 | 10/1988 |
| JP | 04-000265 | 1/1992 |
| JP | 05-292743 | 11/1993 |
| JP | 07-184322 | 7/1995 |
| JP | 2000-116149 | 4/2000 |
| JP | 2001-250665 | 9/2001 |
| JP | 2006-042545 | 2/2006 |
| WO | 2005/109618 | 11/2005 |

* cited by examiner

*Primary Examiner* — Jeffrey Sterrett
(74) *Attorney, Agent, or Firm* — Hamre, Schumann, Mueller & Larson, P.C.

(57) ABSTRACT

A plurality of power supply circuits Z1' are provided according to a load capacity. The power supply circuits Z1' have sides connected in parallel on the side of a direct current input Vi and have sides connected in series on the sides of alternating current outputs Ao. A rectifying circuit DC1 is connected via a resonance circuit Z2 across a combined output of the serially connected sides of the power supply circuits Z1' on the sides of the alternating current outputs Ao. Switching frequencies are simultaneously controlled by a single control signal outputted from a control circuit S1 based on a direct current output voltage detected from the rectifying circuit DC1 through a detection resistor R5.

7 Claims, 7 Drawing Sheets

(a) PRIOR ART CIRCUIT (c) REVERSE BIAS ADDING CIRCUIT

SWITCHING POWER SUPPLY WITH PLURAL RESONANT CONVERTERS AND VARIABLE FREQUENCY

TECHNICAL FIELD

The present invention relates to a resonant switching power supply which obtains a stable direct current output by switching a direct current input and has a resonance circuit in a switching control section.

BACKGROUND ART

In the prior art, switching power supplies characterized by small sizes, light weights, and high power efficiencies have been widely used as power supplies of electronic equipment and so on. As this kind of switching power supply, the following will describe a resonant switching power supply which obtains a direct current output by switching a direct current input into a constant voltage and has a serial-parallel resonance circuit in a switching control section to satisfactorily obtain a constant voltage over a wide range of changes of a load capacity.

As a switching power supply capable of changing a direct current output voltage Vo over a wide range, supplying a stable direct current output voltage to a load, and minimizing a power loss, a resonant switching power supply is available which has a serial-parallel resonance circuit Z2 as shown in FIG. 6 (for example, see International Patent Publication WO 2005/109618 A1).

The following will describe the resonant switching power supply of FIG. 6.

A resonant coil L1 is connected in series with a resonant capacitor C2 and a resonant capacitor C3 is connected in parallel with the primary winding of a switching transformer T1. The values of the resonant capacitor C2 and the resonant coil L1 which are connected in series are mainly set for a heavy load, that is, a low frequency used when a direct current output has a large load current, and the value of the resonant capacitor C3 connected in parallel is set for a light load, that is, a high frequency used when the direct current output has a small load current.

In other words, as a load capacity, a plurality of peaks of frequency characteristics, that is, resonance characteristics having a plurality of peaks are obtained for a wide range of changes from when an output voltage is high and the load is heavy (a large load current), that is, from when the direct current output to the load has a large load current to when the load is minimized, that is, the output voltage is low and the direct current output has a small load current. Thus the overall resonance characteristics cover a wide band and switching frequencies are more stably changed than in the case of single-peak resonance characteristics, so that the direct current output can be stably outputted.

In recent years, such a resonant switching power supply has been requested to respond to a large capacity load. Circuit systems corresponding to large capacity loads are divided broadly into a system in which the circuit system of the resonant switching power supply of FIG. 6 is used and the circuit configuration is simply increased in capacity to achieve higher power (for example, see Japanese Patent Laid-Open No. 2006-042545) and a system in which the circuit of the resonant switching power supply of FIG. 6 is applied as a single power supply circuit U1 as shown in FIG. 7 and the plurality of power supply circuits U1 are connected in parallel to increase power (for example, see Japanese Patent Laid-Open No. 7-184322).

Further, in the resonant switching power supply of FIG. 7, the plurality of power supply circuits U1 corresponding to a capacity have power supply input sections connected in parallel and power supply output sections connected in parallel, thereby increasing a load current.

Moreover, for the control of the power supply circuits U1, various control systems are available which include a system in which a control circuit S2 is provided to control control circuits S1 of the power supply circuits U1 as shown in FIG. 7 and a system in which the control circuits S1 of the power supply circuits are mutually controlled by a mutual control function (for example, see Japanese Patent Laid-Open No. 7-184322).

DISCLOSURE OF THE INVENTION

Problems to be Solved by the Invention

However, the resonant switching power supplies of the prior art have problems that will be described below using specific numerical examples.

For example, when a step-up DC/DC converter power supply acting as a resonance switching power supply has an input voltage of DC 24V and an output capacity of 240 V·8.3 A (2.0 KW), the input current is about 93 A on the assumption that the transmission efficiency is 90%.

In contrast to the power supply, when the circuit system of the resonant switching power supply of FIG. 6 is used as it is to increase power, it is necessary to select components as a smoothing capacitor C1 for smoothing a direct current input, switching transistors Q1 and Q3, a switching transformer T1, resonant capacitors C2 and C3, and a resonant coil L1 so as to guarantee an input current of 93 A (in consideration of a margin and so on, about 120 A). In this case, the single power supply circuit is naturally increased in size and the cost of components increases. Even when a plurality of power supply circuits are provided, the power supply circuits occupy quite a large substrate area.

On the other hand, in the case of a circuit example in which the plurality of power supply circuits U1 are connected in parallel to increase electric energy as in the resonant switching power supply of FIG. 7, the input current of 93 A can be guaranteed by connecting the three power supply circuits (direct current input voltage: DC 24V, direct current output voltage: DC 240 V (about 667 W)). Thus it is possible to solve the problem of the circuit system of the resonant switching power supply shown in FIG. 6.

In this case, however, since the three power supply circuits U1 of similar configurations are used, the circuit configurations become redundant and increase the cost. This tendency becomes noticeable as the number of power supply circuits increases. Further, as to the control of the switching power supply, it is difficult to completely achieve synchronous control even by the foregoing control method.

The present invention has been devised to solve the problems of the prior art. An object of the present invention is to provide a switching power supply which can sufficiently respond to a required power capacity with minimum components even in the case of a large capacity load, completely synchronize the control timing of the switching of multiple circuits to stably change switching frequencies, and stably output a direct current output.

Means for Solving the Problems

In order to solve the foregoing problems, a switching power supply according to a first aspect of the present invention for converting, to a direct current, an alternating current output obtained by switching a direct current input, and supplying the direct current output to a load while controlling the frequency of the switching based on the direct current output, the switching power supply including: a plurality of power supply circuits provided according to a load capacity to obtain the alternating current output, the power supply circuits having input sides connected in parallel and output sides connected in series; a rectifying circuit for obtaining the direct current, the rectifying circuit being connected via a resonance circuit across a combined output of the serially connected output sides of the plurality of power supply circuits; and a control circuit for outputting a single control signal for controlling the frequency of the switching based on the direct current output, wherein the plurality of power supply circuits have switching frequencies simultaneously controlled by the single control signal from the control circuit.

Moreover, a switching power supply according to a second aspect of the present invention is the switching power supply according to the first aspect, wherein the power supply circuit includes: a first capacitor connected in parallel across the direct current input to smooth the direct current input; a first transistor and a third transistor which are connected in series across the direct current input to switch the direct current input; a first ON regulation device for regulating an ON characteristic of the switching of the first transistor; a second transistor for drawing a charge of the first transistor to regulate an OFF characteristic of the switching of the first transistor; a second ON regulation device for regulating an ON characteristic of the switching of the third transistor; a fourth transistor for drawing a charge of the third transistor to regulate an OFF characteristic of the switching of the third transistor; a first transformer fed with outputs of the switching of the first transistor and the third transistor to obtain the alternating current output; and a second transformer for supplying the single control signal from the control circuit to the first transistor and the third transistor.

Further, a switching power supply according to a third aspect of the present invention is the switching power supply according to the first aspect, wherein the resonance circuit includes a first coil and a second capacitor which are connected, for series resonance, in series with the serially connected output sides of the plurality of power supply circuits; and a third capacitor connected, for parallel resonance, in parallel with the serially connected output sides of the plurality of power supply circuits.

Moreover, a switching power supply according to a fourth aspect of the present invention is the switching power supply according to the third aspect, wherein in the resonance circuit, the third capacitor has one end connected between the first coil and the second capacitor.

Further, a switching power supply according to a fifth aspect of the present invention is the switching power supply according to the second aspect, further including a reverse bias circuit for supplying a reverse bias voltage to the second transistors and the fourth transistors of the plurality of power supply circuits.

Moreover, a switching power supply according to a sixth aspect of the present invention is the switching power supply according to the fifth aspect, wherein the reverse bias circuit includes a second coil connected to the second transistor by a choke joint; a first bias power supply for supplying the reverse bias voltage to the second transistor through the second coil; a third coil connected to the fourth transistor by a choke joint; and a second bias power supply for supplying the reverse bias voltage to the fourth transistor through the third coil.

Further, a switching power supply according to a seventh aspect of the present invention is the switching power supply according to the sixth aspect, wherein the reverse bias circuit has the second coil connected to the second transistor in each of the power supply circuits, the reverse bias voltage is supplied from the first bias power supply through the second coil, the third coil is connected to the fourth transistors of all the power supply circuits, and the reverse bias voltage is supplied from the second bias power supply through the third coil.

Advantage of the Invention

As has been discussed, according to the present invention, even when power is supplied to a large capacity load, power is applied from a single power supply to the input sides of a plurality of power supply circuits, so that necessary power is sufficiently supplied from the output sides to the large capacity load. Further, a reverse bias voltage is applied to the gate of a switching transistor, so that the fall time of switching is reduced. Moreover, the circuit configuration is simplified while the heat generation of the switching transistor is suppressed to improve the operating efficiency of the overall device, so that the number of circuit components can be greatly reduced.

Moreover, the control timing of the plurality of power supply circuits is completely synchronized, so that a switching frequency is stably changed and stable power supply can be achieved even in case of fluctuations in input voltage, output voltage, and load current.

BEST MODE FOR CARRYING OUT THE INVENTION

A switching power supply illustrating an embodiment of the present invention will be specifically described below with reference to the accompanying drawings. The following explanation will describe a multi serial-parallel resonant switching power supply in which three serial-parallel resonant switching power supply circuits are connected in parallel.

First Embodiment

The following will describe a switching power supply according to a first embodiment of the present invention.

Figure 1:
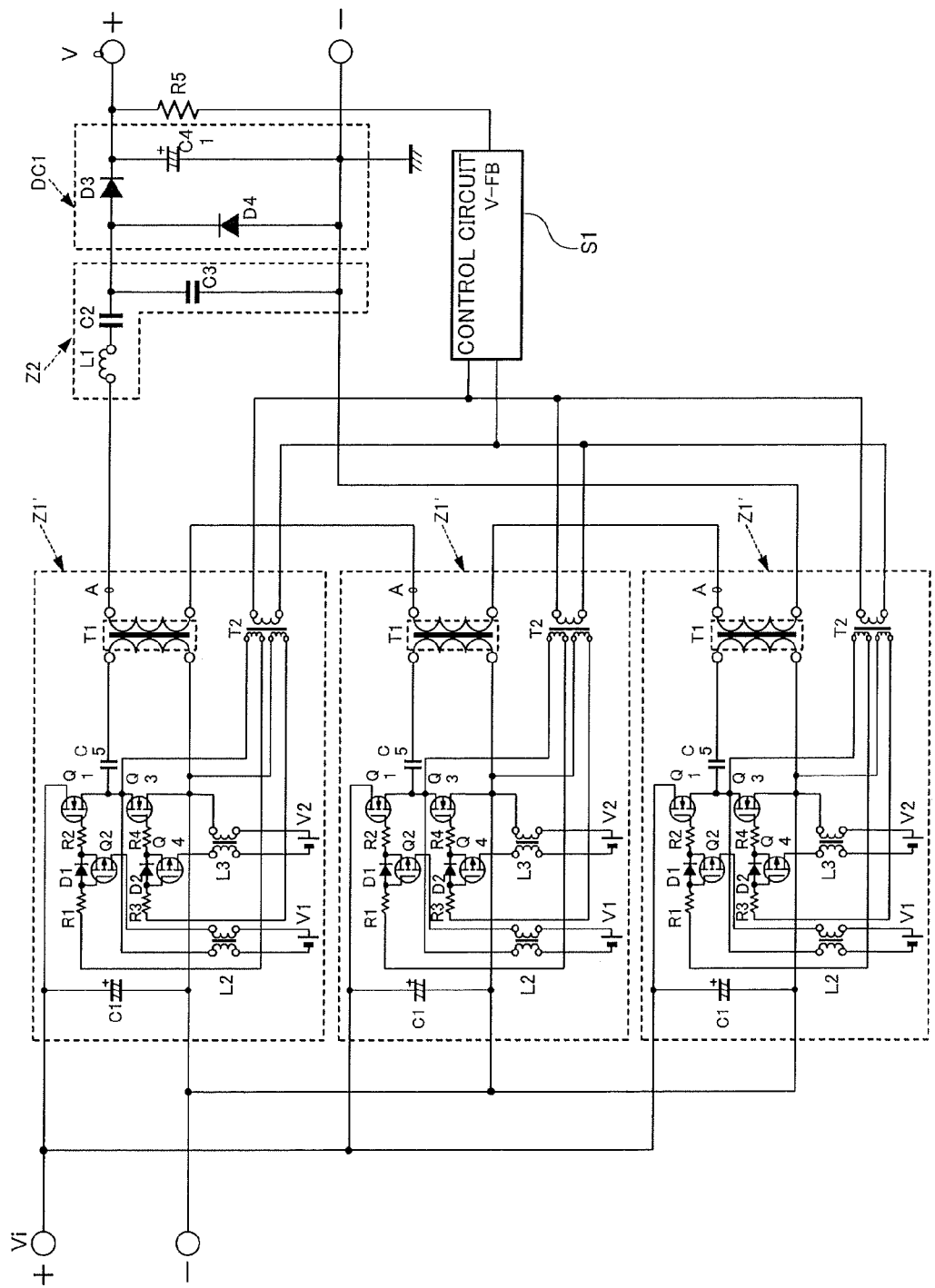
FIG. 1 is a circuit diagram showing a structural example of a switching power supply according to a first embodiment of the present invention.

FIG. 1 is a circuit diagram showing the configuration of a multi serial-parallel resonant switching power supply which is the switching power supply of the first embodiment. In FIG. 1, reference character Vi denotes a direct current input, reference character Ao denotes alternating current outputs, reference character Vo denotes a direct current output, reference character Z1' denotes power supply circuits, reference character Z2 denotes a resonance circuit, reference character DC1 denotes a rectifying circuit, reference character S1 denotes a control circuit, reference character C1 denotes smoothing capacitors, reference character Q1 denotes switching transistors, reference character Q2 denotes drawing transistors, reference character Q3 denotes switching transistors, reference character Q4 denotes drawing transistors, reference character R1 denotes resistors (ON regulation devices), reference character D1 denotes diodes (ON regulation devices), reference character R2 denotes resistors (ON regulation devices), reference character R3 denotes resistors (ON regulation devices), reference character D2 denotes diodes (ON regulation devices), reference character R4 denotes resistors (ON regulation devices), reference character C5 denotes coupling capacitors, reference character T1 denotes switching transformers, reference character T2 denotes drive transformers, reference character L2 denotes choke coils, reference character L3 denotes choke coils, reference character V1 denotes bias power supplies, reference character V2 denotes bias power supplies, reference character C2 denotes a resonant capacitor, reference character C3 denotes a resonant capacitor, reference character L1 denotes a resonant coil, reference character D3 denotes a diode, reference character D4 denotes a diode, reference character C41 denotes a smoothing capacitor, and reference character R5 denotes a detection resistor.

The following will describe the multi serial-parallel resonant switching power supply made up of the foregoing constituent elements.

In the switching power supply of the first embodiment, basically the alternating current output Ao obtained by switching the direct current input Vi is rectified into a direct current, a switching frequency is controlled based on the voltage of the direct current output Vo to stabilize the direct current output voltage, and then the direct current output Vo is supplied to a load.

In other words, in the switching power supply of the first embodiment, the plurality of power supply circuits Z1' are provided according to a predetermined necessary load capacity. Each of the power supply circuits Z1' obtains the alternating current output Ao by switching the direct current input Vi. The input sides of the power supply circuits Z1' are connected in parallel and the output sides of the power supply circuits Z1' are connected in series.

Further, the switching power supply includes the single rectifying circuit DC1 for direct current electrification and the single control circuit S1. The rectifying circuit DC1 is connected across a combined output of the serially connected output sides of the plurality of power supply circuits Z1' via the single resonance circuit Z2, and the control circuit S1 controls switching frequencies in the power supply circuits Z1' based on a direct current output voltage detected from the single rectifying circuit DC1 through the detection resistor R5. The switching frequencies of the plurality of power supply circuits Z1' are simultaneously controlled by a single control signal from the single control circuit S1.

Moreover, in the resonant switching power supply of FIG. 1, the power supply circuit Z1' is made up of the smoothing capacitor C1 which is connected in parallel across the direct current input Vi to smooth the direct current input Vi, the switching transistor Q1 and the switching transistor Q3 which are connected in series across the direct current input Vi to switch the current input Vi, the resistor R1, the diode D1, and the resistor R2 which act as ON regulation devices for regulating the ON characteristics (rising characteristics) of the switching of the switching transistor Q1, the drawing transistor Q2 which draws the charge of the switching transistor Q1 to regulate the OFF characteristics (falling characteristics) of the switching of the switching transistor Q1, the resistor R3, the diode D2, and the resistor R4 which act as ON regulation devices for regulating the ON characteristics (rising characteristics) of the switching of the switching transistor Q3, the drawing transistor Q4 which draws the charge of the switching transistor Q3 to regulate the OFF characteristics (falling characteristics) of the switching of the switching transistor Q3, the switching transformer T1 which is fed with switching outputs from the switching transistor Q1 and the switching transistor Q3 to obtain the alternating current output Ao, and the drive transformer T2 which supplies the single control signal from the control circuit S1 to the switching transistor Q1 and the switching transistor Q3.

The resonance circuit Z2 has the resonant coil L1 connected to one end of the output side of the resonance circuit Z2. The secondary windings of the switching transformers T1 in the plurality of power supply circuits Z1' are connected in series with the one end of the output side of the resonance circuit Z2. Further, the resonant capacitor C2 is connected in series with the one end of the output side of the resonance circuit Z2. Moreover, the resonant capacitor C3 is connected in parallel across the output side to which the plurality of power supply circuits Z1' are connected in series.

In this configuration, the rectifying circuit DC1 constitutes a half-wave voltage doubler rectifying circuit made up of the diode D3 connected in series with one end of the resonance circuit Z2, the diode D4 connected in parallel across the resonance circuit Z2, and the smoothing capacitor C41 connected in parallel across the resonance circuit Z2 via the diode D3.

Figure 2:
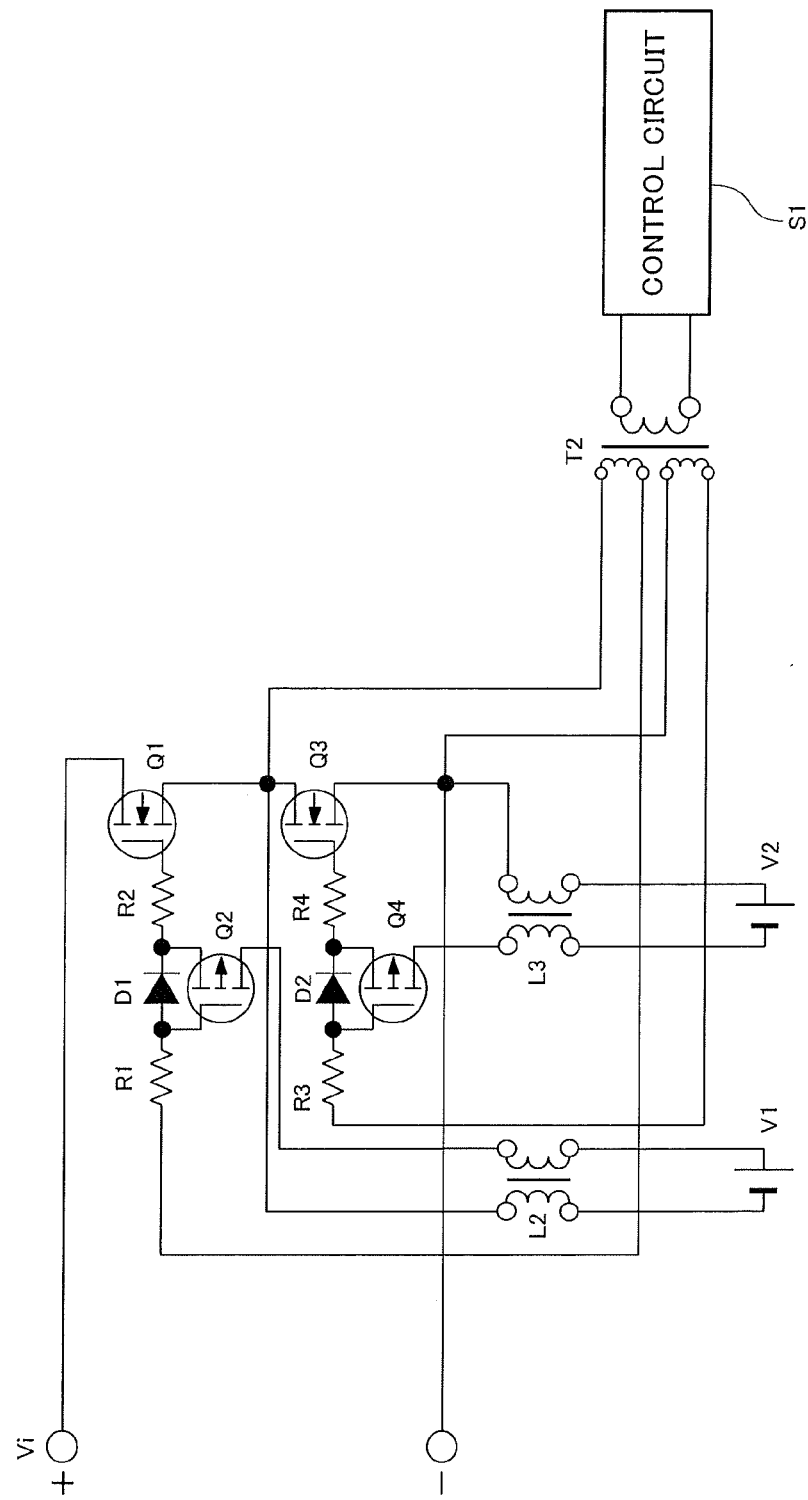
FIG. 2 is a circuit diagram showing a structural example of a reverse bias circuit in the switching power supply of the first embodiment.
Figure 3:
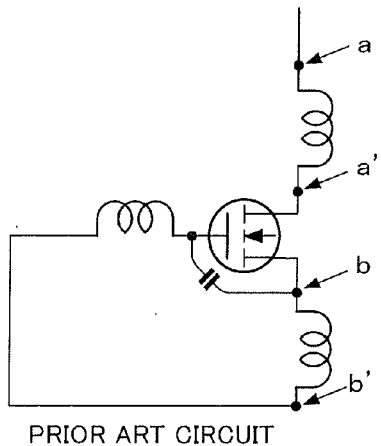
FIG. 3 is an explanatory drawing showing the operating principle of the reverse bias circuit in the switching power supply of the first embodiment.
Figure 3:
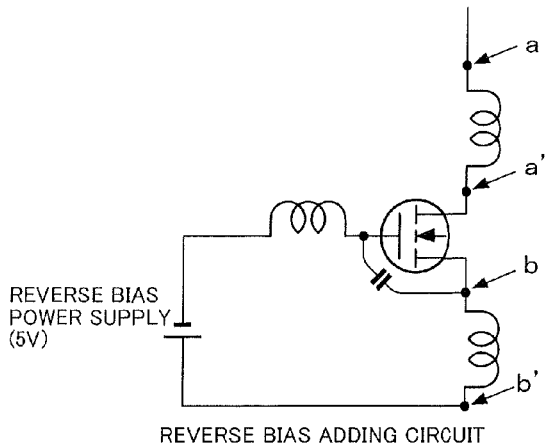
Figure 3:
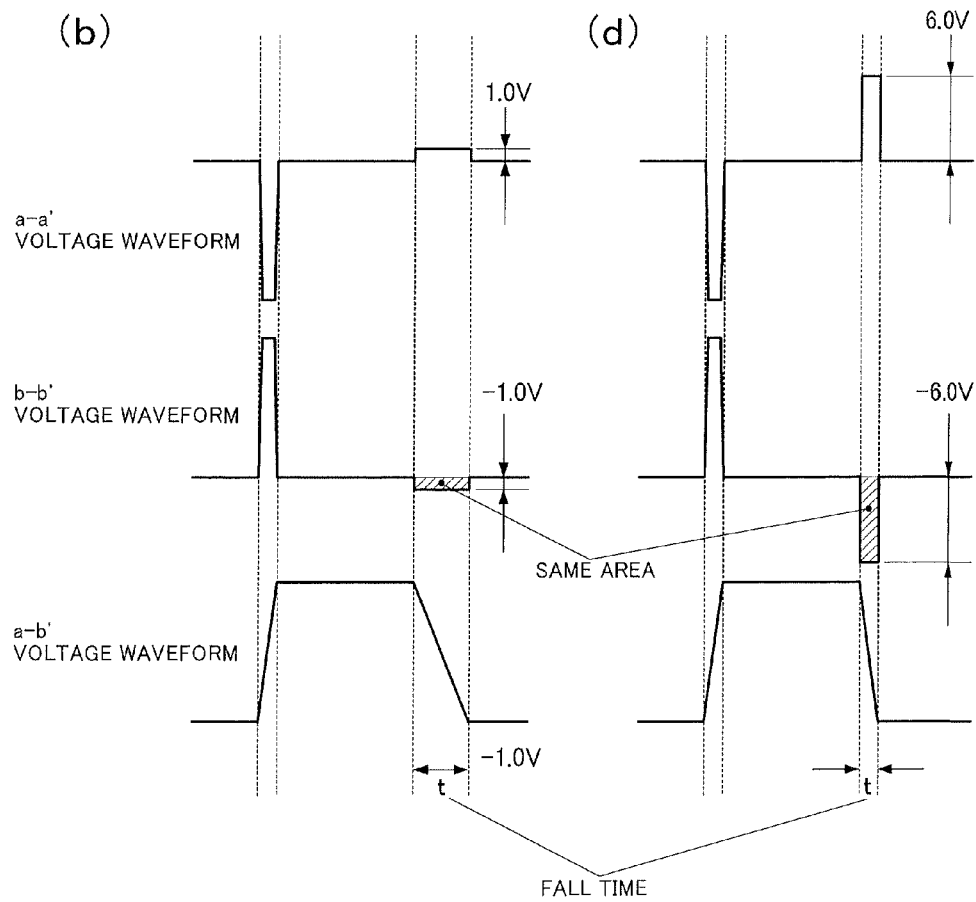

Referring to FIGS. 2 and 3, a reverse bias circuit will be specifically described below.

As to the OFF characteristics of the switching of the switching transistors Q1 and Q3, in contrast to a circuit of the prior art shown in FIGS. 3(a) and 3(b), the drawing transistors Q2 and Q4 are connected to an ON regulation device made up of the resistor R1, the diode D1, the resistors R2 and R3, the diode D2, and the resistor R4 on the gate sides of the switching transistors Q1 and Q3 as in a first prior art example in order to quickly draw charge, which has been accumulated during power on, from a gate terminal and shorten an OFF time as in a circuit shown in FIGS. 3(c) and 3(d). In order to further shorten the OFF time, the reverse bias circuits for supplying reverse bias voltages are connected to the drawing transistors Q2 and Q4 of the plurality of power supply circuits Z1'.

The reverse bias circuit is made up of the choke coil L2 connected to the drawing transistor Q2, the bias power supply V1 for supplying a reverse bias voltage to the drawing transistor Q2 through the choke coil L2, the choke coil L3 connected to the drawing transistor Q4, and the bias power supply V2 for supplying the reverse bias voltage to the drawing transistor Q4 through the choke coil L3.

For example, as shown in FIG. 3, when the switching transistor has a threshold voltage of 1.0 V and a large current passes between a and b', the reactance component of the lead (particularly the drain and source) of the switching transistor considerably affects the switching operation, so that as shown in FIGS. 3(a) and 3(b), the fall time of switching increases in the circuit of the prior art. The increase in the fall time of switching affects the heat generation of the switching transistor and naturally reduces the operating efficiency.

In order to solve the problem, as shown in FIGS. 3(c) and 3(d), the reverse bias voltage is applied to the gate of the switching transistor, so that the fall time of switching further decreases, that is, the heat generation of the switching transistor can be suppressed and the operating efficiency naturally improves.

The following will describe an increase in capacity in the configuration of the foregoing embodiment according to a specific numerical example, in comparison with the configuration of the prior art described in Background Art.

In the following explanation, power is increased from, for example, power supply to a small capacity load of 240 V·2.8 A (667 W) to power supply to a large capacity load of 240 V·8.3 A (2.0 KW) which is about three times larger than the small capacity load. To simplify the explanation, it is assumed that the primary side of the switching transformer T1 has a voltage of 24 V and there is no conversion (passage) loss on the switching transformer T1, the rectifying circuit DC1 and a rectifying circuit DC2, the resonance circuit Z2, and so on.

Figure 6:
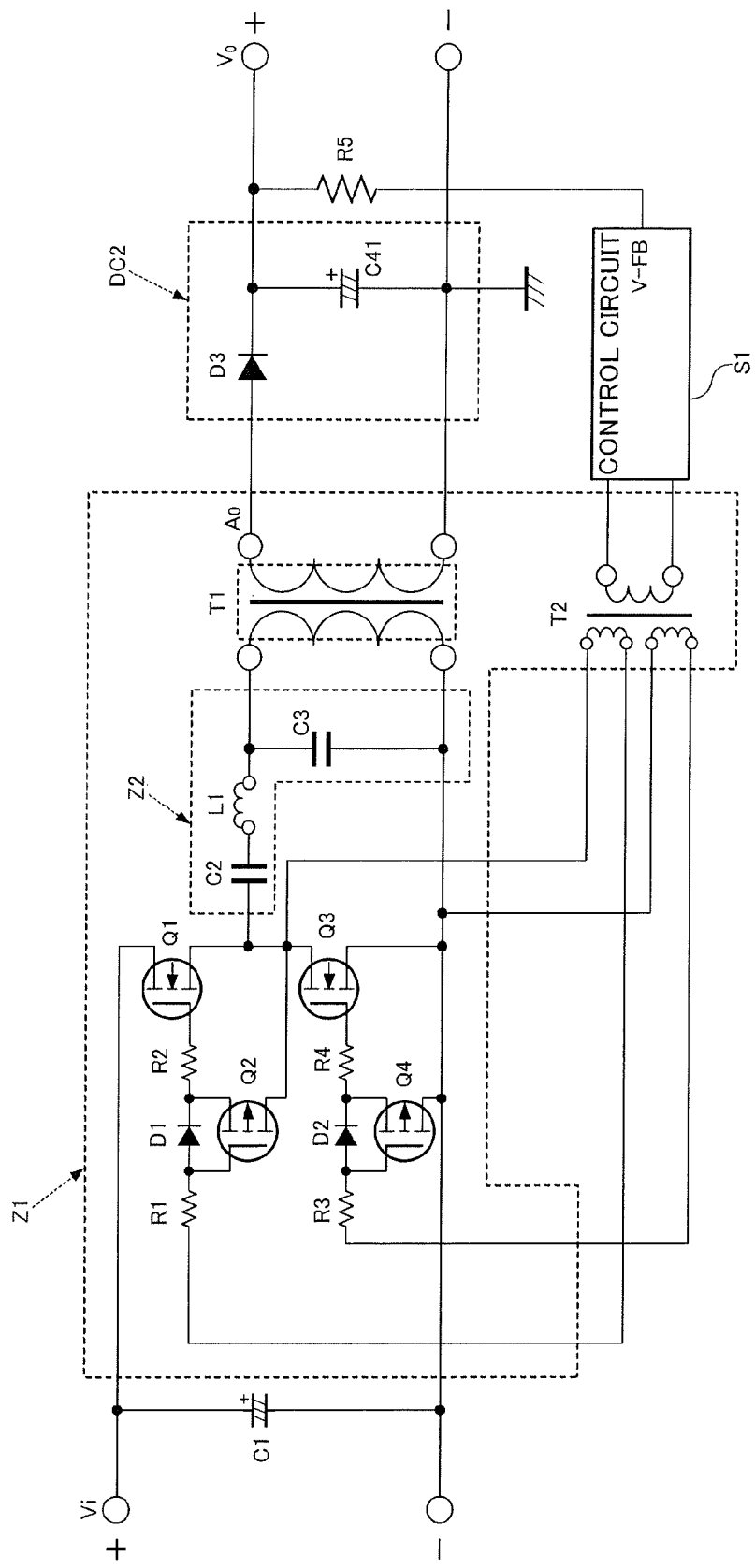
FIG. 6 is a circuit diagram showing a first structural example (using a unit of a power supply circuit 1) of a switching power supply according to the prior art.

First, when power is supplied to the small capacity load in the configuration of the first prior art example shown in FIG. 6, in the case of a load capacity of 240 V·2.8 A (667 W), the secondary side of the switching transformer T1 requires a power of 240 V·2.8 A (667 W) as in the load capacity. Thus it is only necessary to supply a current of 24V·28 A to the primary side of the switching transformer T1.

When the power is increased for power supply to the large capacity load in the configuration of the first prior art example shown in FIG. 6, in the case of a load capacity of 240 V·8.3 A (2.0 KW), the secondary side of the switching transformer T1 requires a power of 240 V·8.3 A (2.0 KW) as in the load capacity. Thus it is necessary to supply a current of 24 V·83 A to the primary side of the switching transformer T1 and a circuit component on the primary side of the switching transformer T1 has to respond to a current of 24 V·83 A which is about three times larger than the current for the power supply to the small capacity load.

Figure 7:
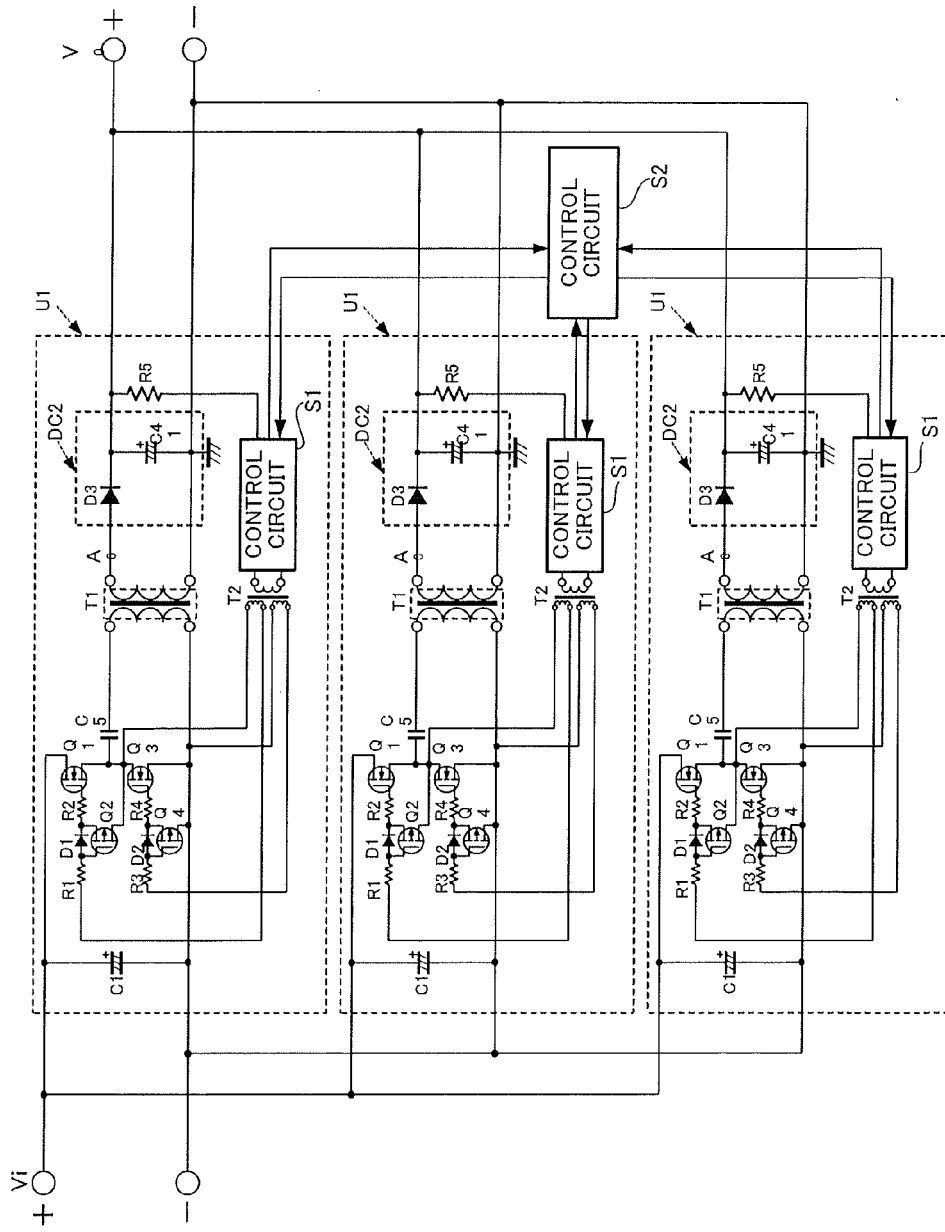
FIG. 7 is a circuit diagram showing a second structural example (using a unit of a power supply circuit 3 parallely) of a switching power supply according to the prior art.

When power is increased in the configuration of a second prior art example shown in FIG. 7 to supply power to the large capacity load, in the case of a load capacity of 240 V·8.3 A (2.0 KW), it is only necessary to obtain a power of 240 V·2.8 A (667 W) on the secondary side of the switching transformer T1 in the single power supply circuit U1. Thus it is only necessary to supply a current of 24 V·28 A to the primary side of the switching transformer T1 and a circuit component on the primary side of the switching transformer T1 only has to respond to a current of 24 V·28 A as in the power supply to the small capacity load.

However, when the power is increased in the configuration of the first prior art example shown in FIG. 6 and the configuration of the second prior art example shown in FIG. 7, many problems arise as has been discussed in "Problems to be Solved by the Invention".

In order to supply power to the large capacity load, when power is increased in the configuration of the first embodiment of FIG. 1, the load capacity is set at 240 V·8.3 A (2.0 KW), so that in the single power supply circuit Z1', the secondary side of the switching transformer T1 requires a power of 80 V·8.3 A (667 W) but the primary side of the switching transformer T1 only requires current supply of 24 V·28 A. Thus a circuit component used on the primary side of the switching transformer T1 only has to respond to a current of 24 V·28 A as in the power supply to the small capacity load.

According to the foregoing explanation, for example, the ten power supply circuits Z1' (direct current input voltage: DC 24 V, direct output voltage: DC 24 V (about 200 W)) using minimum components are prepared, the input sides of the power supply circuits Z1' are connected in parallel and the output sides of the power supply circuits Z1' (the secondary winding sides of the switching transformers T1) are connected in series, thereby achieving a resonant switching power supply which can obtain a power supply capacity with a direct current voltage of 240 V (2.0 KW) as a direct current output.

Further, the smoothing capacitor C1, the switching transistors Q1 and Q3, and the switching transformer T1 in each of the power supply circuits Z1' only have to guarantee a current capacity of 83 A (about 100 A in consideration of a margin and so on)/ten circuits=10 A, thereby increasing flexibility in the choice of a circuit configuration at low manufacturing cost. Moreover, the serial-parallel resonance circuit Z2 only has to be a component capable of guaranteeing a (maximum) load current of about 8.3 A (about 10 A even in consideration of a margin and so on).

According to the switching power supply of the first embodiment, specifically, it is possible to easily respond to a power capacity only by adding the minimum number of power supply circuits according to the number of exchangers (load capacity) as in a power supply used for a base station of a cellular phone and the like, and it is possible to achieve stable power supply even when the direct current input of a battery and the like has a wide voltage fluctuation range and complicated fluctuations in output voltage and fluctuations in load current.

Second Embodiment

The following will describe a switching power supply according to a second embodiment of the present invention.

Figure 4:
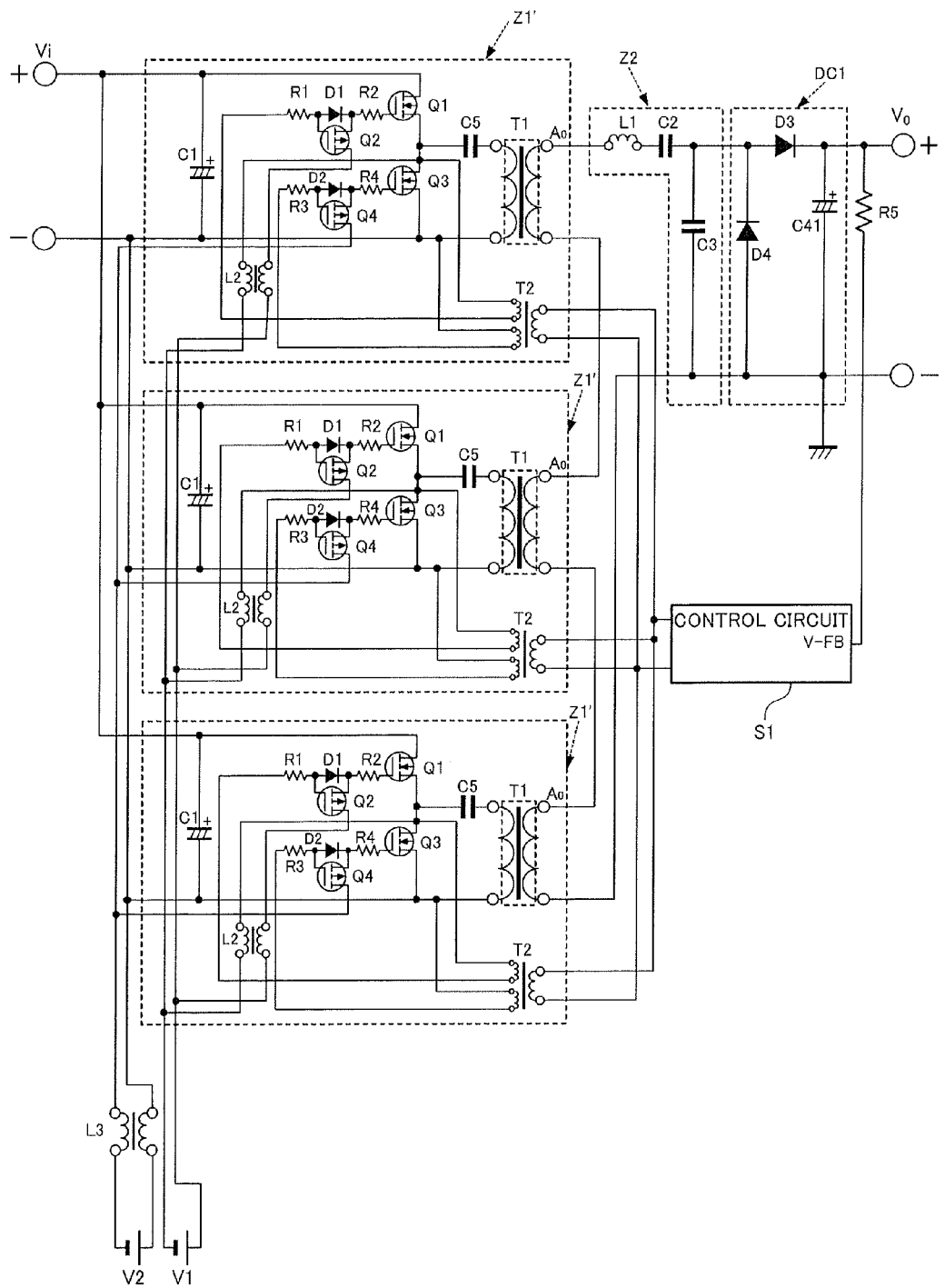
FIG. 4 is a circuit diagram showing a structural example of a switching power supply according to a second embodiment of the present invention.

Referring to FIG. 4, the switching power supply of the second embodiment will be described below in which a reverse bias circuit is simplified in contrast to the circuit configuration of the first embodiment.

FIG. 4 is a circuit diagram showing the structural example of the switching power supply according to the second embodiment.

As shown in FIG. 4, the reverse bias circuit in the switching power supply of the second embodiment is configured such that a choke coil L2 is connected to a drawing transistor Q2 in each power supply circuit Z1', a reverse bias voltage is supplied from a bias power supply V1 through each of the choke coils L2, a choke coil L3 is connected to a drawing transistor Q4 in each of the power supply circuits Z1', and a reverse bias voltage is supplied from a bias power supply V2 through the single choke coil L3.

According to the switching power supply of the second embodiment, as the reverse bias circuit for supplying the reverse bias voltage to each of the drawing transistors Q2 and each of the drawing transistors Q4, the pair of (two) bias power supplies V1 and V2 is shared by all of the plurality of power supply circuits Z1', so that it is possible to simplify the circuit configuration of the overall device and greatly reduce the number of components in the circuit and the manufacturing cost.

Figure 5:
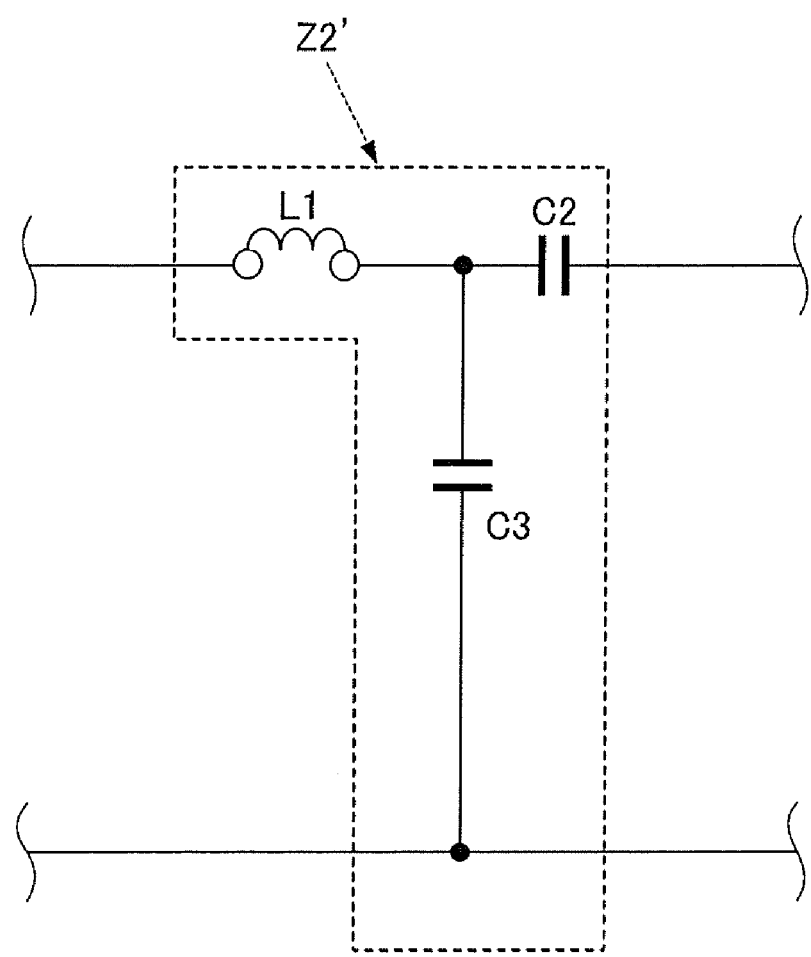
FIG. 5 is a circuit diagram showing another structural example of a resonance circuit in the switching power supply according to the embodiment of the present invention.

In the configurations of the foregoing embodiments, as a resonance circuit connected across the serially connected output sides of the power supply circuits Z1', the resonance circuit Z2 is used in which the resonant capacitor C3 connected in parallel across the serially connected output sides of the power supply circuits Z1' is connected to the resonant coil L1 which is connected in series with one end of the serially connected output sides of the power supply circuits Z1' and is connected to the subsequent stage (direct current output side) of the resonant capacitor C2. The present invention can be similarly implemented by using, instead of the resonance circuit Z2 configured thus, a resonance circuit Z2' in which as shown in FIG. 5, one end (positive potential side) of the resonant capacitor C3 connected in parallel across the serially connected output sides of the power supply circuits Z1' is connected to the junction of the resonant capacitor C2 and the resonant coil L1 connected in series with one end of the serially connected output sides of the power supply circuits Z1'.

In the configurations of the foregoing embodiments, as a rectifying circuit for obtaining the direct current output Vo, a half-wave voltage doubler rectifying circuit like the rectifying circuit DC1 is used which is made up of the diode D3, the diode D4, and the smoothing capacitor C41 and thus can achieve voltage doubler rectification. Instead of the rectifying circuit DC1, a half-wave rectifying circuit like the rectifying circuit DC2 of the prior art shown in FIG. 6 or 7 may be used which is only made up of the diode D3 and the smoothing capacitor C41, so that the number of components can be reduced and the circuit configuration can be simplified, though voltage doubler rectification cannot be achieved.

Moreover, the rectifying circuit for obtaining the direct current output Vo may be a full-wave voltage rectifying circuit (not shown) which can improve waveform characteristics by reducing ripple components on the direct current output Vo or may be a full bridge circuit which can achieve higher power in addition to the improved waveform characteristics.

In the examples of the configurations of the foregoing embodiments, the power supply circuits Z1' of three blocks are connected in parallel, so that power is increased to achieve power supply to a large capacity load three times larger than a small capacity load to which power can be supplied only using the power supply circuit Z1' of one block. The number of blocks where the power supply circuits Z1' are connected in parallel is not limited to three. The number of blocks of the power supply circuit Z1' connected in parallel may be optionally set according to a power capacity which can be supplied only using the power supply circuit Z1' of one block or a necessary power supply capacity set beforehand according to a load capacity for power supply.

INDUSTRIAL APPLICABILITY

The switching power supply of the present invention can sufficiently respond to a required power capacity by using minimum components even in the case of a large capacity load, completely synchronize the control timing of the switching of a plurality of circuits to stably change switching frequencies, and stably output a direct current output. The present invention is used as power supplies of various kinds of electronic equipment and is useful for a power supply and the like for supplying a stable output voltage even in case of fluctuations in input voltage, output voltage, and load current.

The invention claimed is:

1. A switching power supply for converting, to a direct current, an alternating current output obtained by switching a direct current input, and supplying the direct current output to a load while controlling a frequency of the switching based on the direct current output,
the switching power supply comprising:
a plurality of power supply circuits provided according to a load capacity to obtain the alternating current output, the power supply circuits having input sides connected in parallel and output sides connected in series;
a rectifying circuit for obtaining the direct current, the rectifying circuit being connected via a resonance circuit across a combined output of the serially connected output sides of the plurality of power supply circuits; and
a control circuit for outputting a single control signal for controlling the frequency of the switching based on the direct current output,
wherein the plurality of power supply circuits have switching frequencies simultaneously controlled by the single control signal from the control circuit.

2. The switching power supply according to claim 1, wherein the resonance circuit comprises:
a first coil and a second capacitor which are connected, for series resonance, in series with the serially connected output sides of the plurality of power supply circuits; and
a third capacitor connected, for parallel resonance, in parallel with the serially connected output sides of the plurality of power supply circuits.

3. The switching power supply according to claim 2, wherein in the resonance circuit, the third capacitor has one end connected between the first coil and the second capacitor.

4. The switching power supply according to claim 1, wherein the power supply circuit comprises:
a first capacitor connected in parallel across the direct current input to smooth the direct current input;
a first transistor and a third transistor which are connected in series across the direct current input to switch the direct current input;
a first ON regulation device for regulating an ON characteristic of the switching of the first transistor;
a second transistor for drawing a charge of the first transistor to regulate an OFF characteristic of the switching of the first transistor;
a second ON regulation device for regulating an ON characteristic of the switching of the third transistor;
a fourth transistor for drawing a charge of the third transistor to regulate an OFF characteristic of the switching of the third transistor;
a first transformer fed with outputs of the switching of the first transistor and the third transistor to obtain the alternating current output; and
a second transformer for supplying the single control signal from the control circuit to the first transistor and the third transistor.

5. The switching power supply according to claim 4, further comprising a reverse bias circuit for supplying a reverse bias voltage to the second transistors and the fourth transistors of the plurality of power supply circuits.

6. The switching power supply according to claim 5, wherein the reverse bias circuit comprises:
a second coil connected to the second transistor by a choke joint;
a first bias power supply for supplying the reverse bias voltage to the second transistor through the second coil;
a third coil connected to the fourth transistor by a choke joint; and
a second bias power supply for supplying the reverse bias voltage to the fourth transistor through the third coil.

7. The switching power supply according to claim 6, wherein the reverse bias circuit has the second coil connected to the second transistor in each of the power supply circuits, the reverse bias voltage is supplied from the first bias power supply through the second coil, the third coil is connected to the fourth transistors of all the power supply circuits, and the reverse bias voltage is supplied from the second bias power supply through the third coil.

* * * * *